MUSHROOM CLOUD

WIND HODOGRAPH

BLOCK DIAGRAM

INVENTORS
Harold K. Skramstad
Julius H. Wright
Leonard Taback
BY
Arthur Vinograd ATTORNEY
Leonard F. Stoll AGENT INVENTORS
Harold K. Skramstad
Julius H. Wright
Leonard Taback
BY Arthur Vinzgrad ATTORNEY
Leonard F. Stoll AGENT

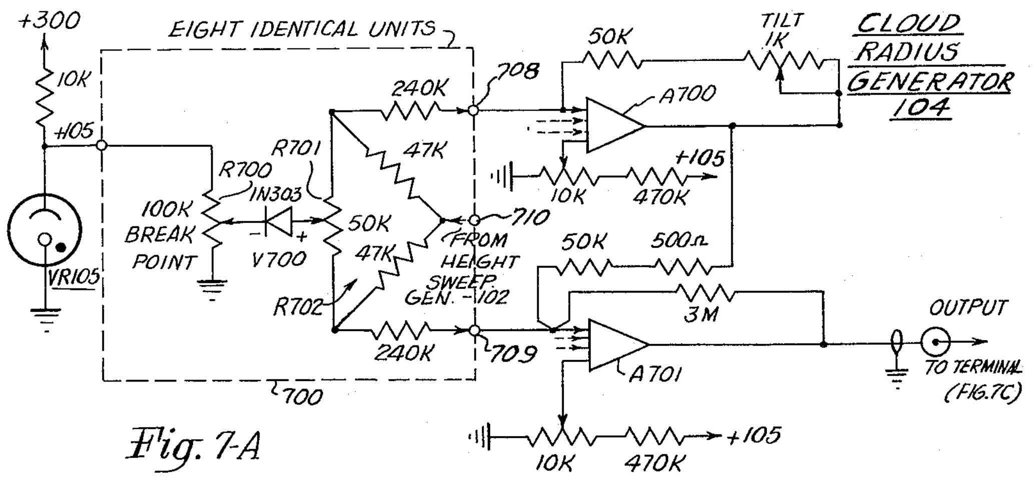
Fig. 7-A
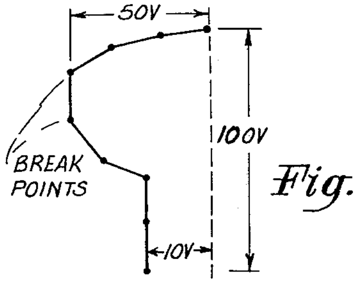
Fig. 7-B
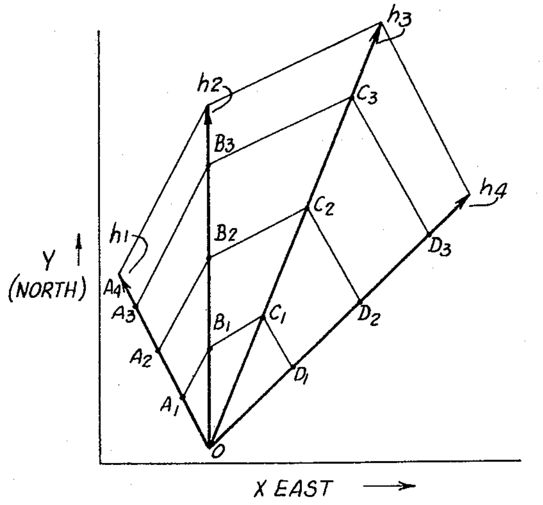
Fig. 5-A
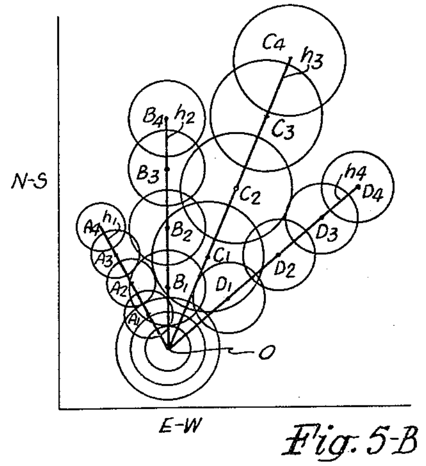
Fig. 5-B
INVENTORS
Harold K. Skramstad
Julius H. Wright
Leonard Taback
BY
Arthur V. [signature] ATTORNEY
Leonard F. Stoll AGENT INVENTORS
Harold K. Skramstad
Julius H. Wright
Leonard Taback
BY
Arthur Vinograd ATTORNEY
Leonard F. Stoll AGENT INVENTORS
Harold K. Skramstad
Julius H. Wright
Leonard Taback BY
Arthur [signature] ATTORNEY
Leonard F. [signature] AGENT INVENTORS
Harold K. Skramstad
Julius H. Wright
Leonard Taback BY Arthur Vinograd ATTORNEY
Leonard F. Stoll AGENT Aug. 29, 1961 H. K. SKRAMSTAD ET AL 2,998,193

ELECTRONIC ANALOGUE COMPUTERS FOR RADIOACTIVE FALLOUT PREDICTION

Filed April 5, 1957 9 Sheets-Sheet 7

INVENTORS
Harold K. Skramstad
Julius H. Wright
Leonard Taback

BY Arthur Vinograd ATTORNEY
Leonard F. Stoll AGENT

Aug. 29, 1961 H. K. SKRAMSTAD ET AL 2,998,193

ELECTRONIC ANALOGUE COMPUTERS FOR RADIOACTIVE FALLOUT PREDICTION

Filed April 5, 1957 9 Sheets-Sheet 8

OUTPUT OF N-S WINDS SUMMER

OUTPUT OF RADIOACTIVITY GENERATOR

OUTPUT OF N-S SLOWNESS MODULATOR

SIMPLE SPOKE DISPLAY

INVENTORS

Harold K. Skramstad

Julius H. Wright

Leonard Taback

BY

Arthur Vinograd ATTORNEY

Leonard F. Stoll AGENT

INTENSITY MODULATED SPOKES

SPOKE TIPS

SPIRAL RASTERS

COMPLETE FALLOUT DISPLAY

INVENTORS
Harold K. Skramstad
Julius H. Wright
BY Leonard Taback
Arthur Vmogead ATTORNEY
Leonard F. Stoll AGENT 2,998,193

ELECTRONIC ANALOGUE COMPUTERS FOR RADIOACTIVE FALLOUT PREDICTION

Harold K. Skramstad, Washington, D.C., and Julius H. Wright, Bethesda, and Leonard Taback, Mount Rainier, Md., assignors to the United States of America as represented by the Secretary of Commerce Filed Apr. 5, 1957, Ser. No. 651,121
13 Claims. (Cl. 235—184)

This invention relates to the art of computing and particularly contemplates an improved analogue computer which can be used to determine the final ground position of radioactive fallout particles in an atomic cloud. In accordance with the principles of this invention the final ground positions of the fallout particles are computed in terms of rectilinear coordinates and the results of the fallout are further manifested in the form of a simulated display pattern which visually indicates the ground distribution and total intensity of the computed radioactive fallout as indicated in FIG. 9B.

The need for determining the geographic pattern of radioactive fallout that occurs following a nuclear explosion is apparent. The present invention determines the fallout pattern on the basis of known wind velocity and direction at various altitudes, and intensity of radioactivtiy in the mushroom cloud as a function of particle size and initial height in the cloud. The developed output data is manifested as a display on a cathode-ray tube, in such a manner that the average or total luminance of the tube screen at any point represents the intensity of radioactive fallout at the geographical location represented by that point.

It is accordingly an immediate object of the present invention to provide a radioactive particle fallout computer which is small in size, portable, and low in cost.

An additional object of the present invention is to provide a radioactive particle fallout computer in which the determination of radioactive fallout can be quickly represented automatically without requiring mathematical or numerical analysis.

It is a still further object of the present invention to provide a radioactive particle fallout computer which gives an instantaneous solution to the problem of computing radioactive fallout.

A still further object of the present invention is to provide a radioactive particle fallout computer which computes the degree of fallout and presents the results in the form of a visual pattern representation.

An additional object of this invention is to provide voltage signal generating circuits which, when applied to a cathode-ray display tube, will provide simulations corresponding to radioactive particle distribution in an atomic cloud corresponding to such factors as height of a particle in the cloud, displacement of a particle with respect to the vertical axis of the cloud and the effect of horizontal winds acting on a particle.

Other uses and advantages of the invention will become apparent upon reference to the specification and drawings, in which FIG. 1 is a block diagram showing the over-all arrangement of the components comprising the radioactive fallout computer comprising the present invention;

FIG. 5A is a diagram illustrating the effects of winds on radio-active fallout particles;

FIG. 5B is a diagram illustrating the added effects of particle distribution in connection with wind effects;

Figure 6A:
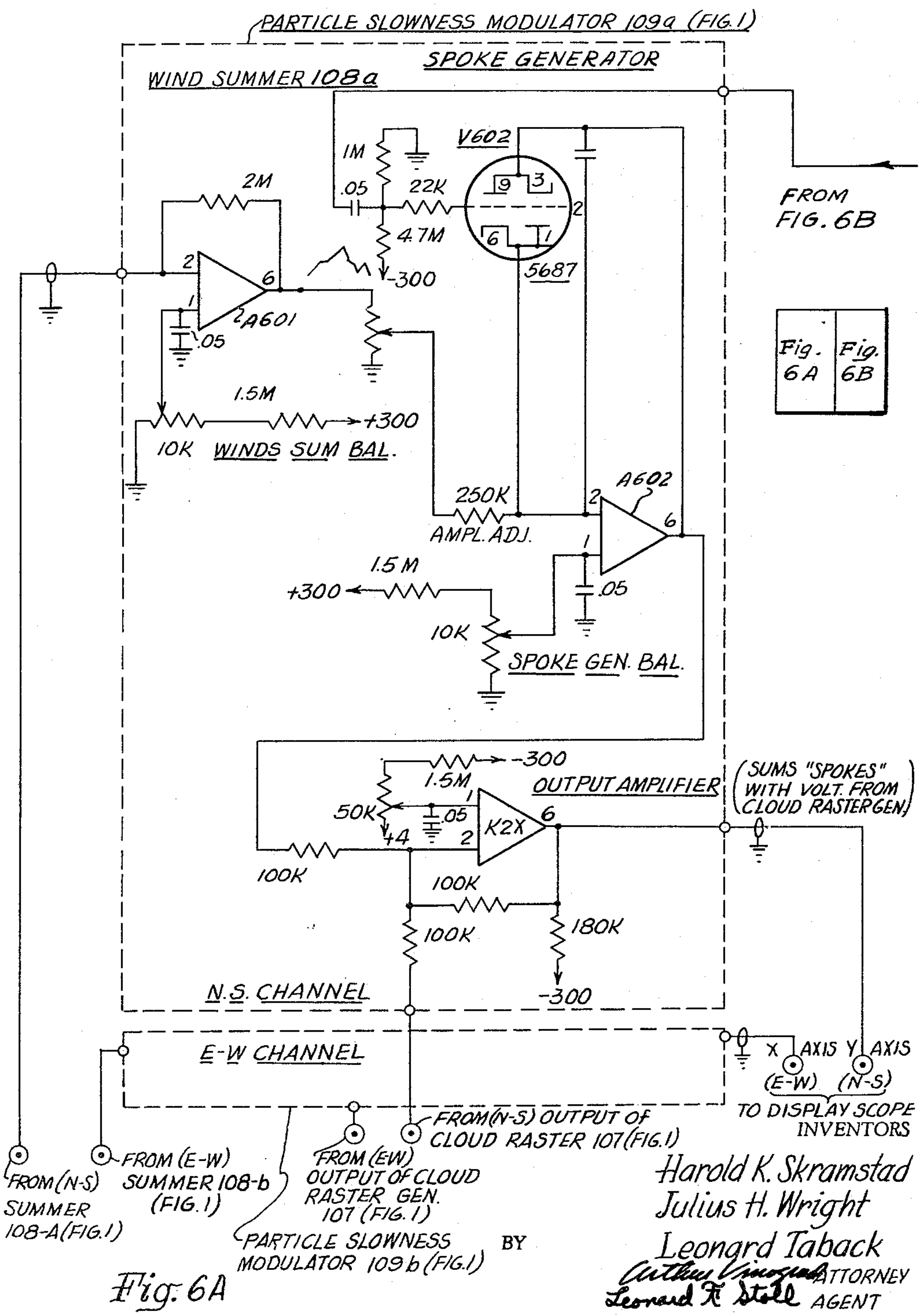
Figure 6B:
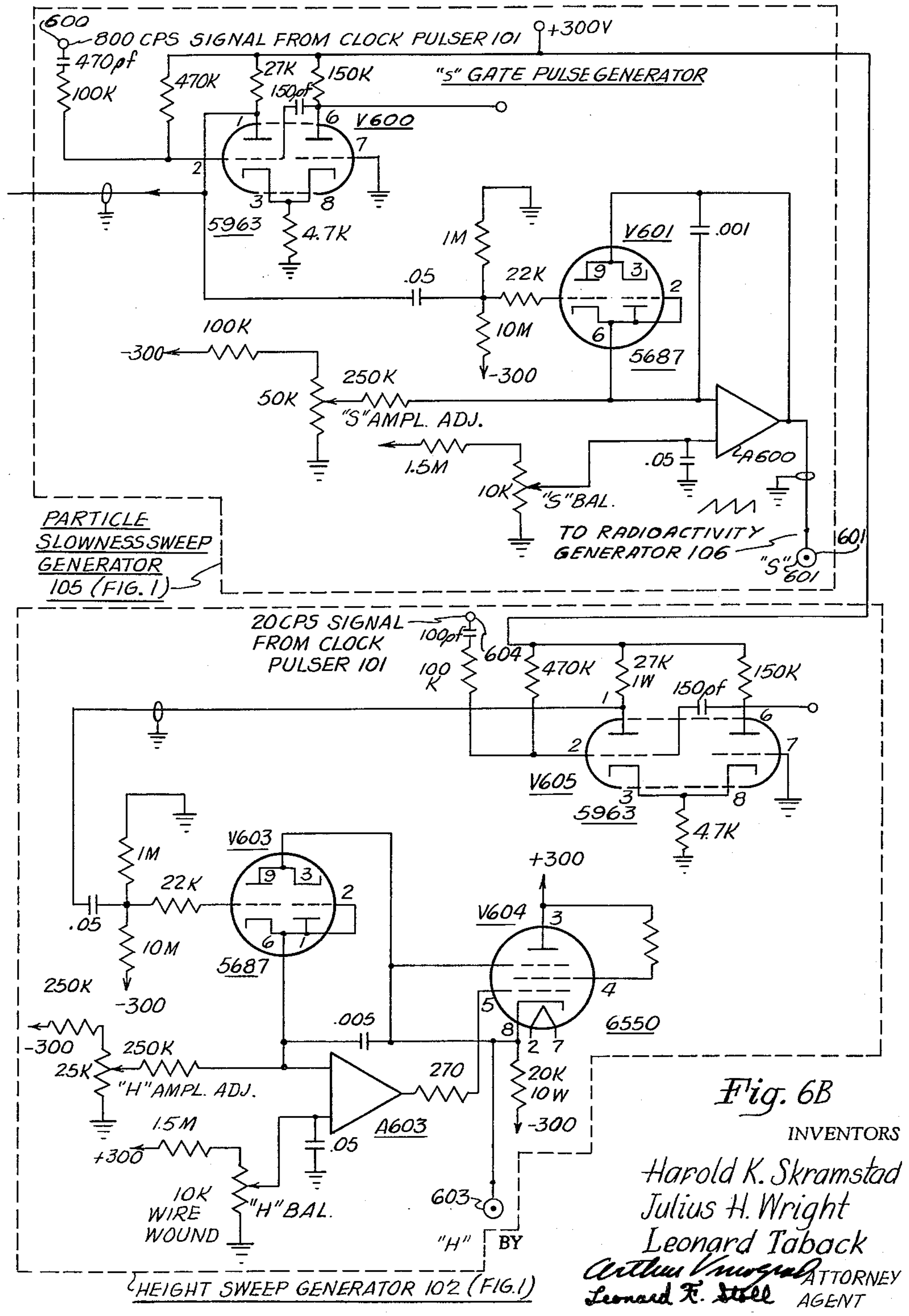
Figure 7C:
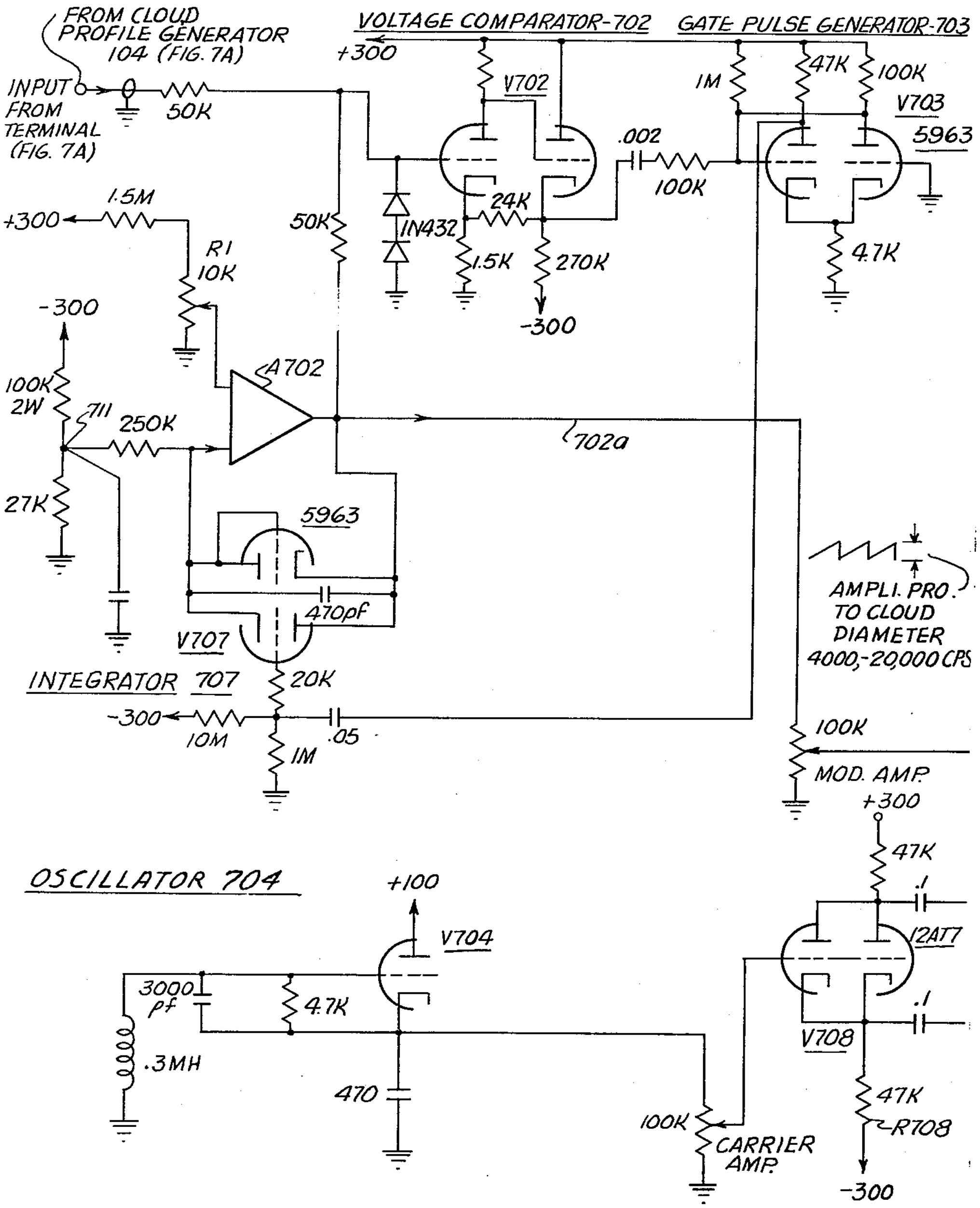
Figure 7D:
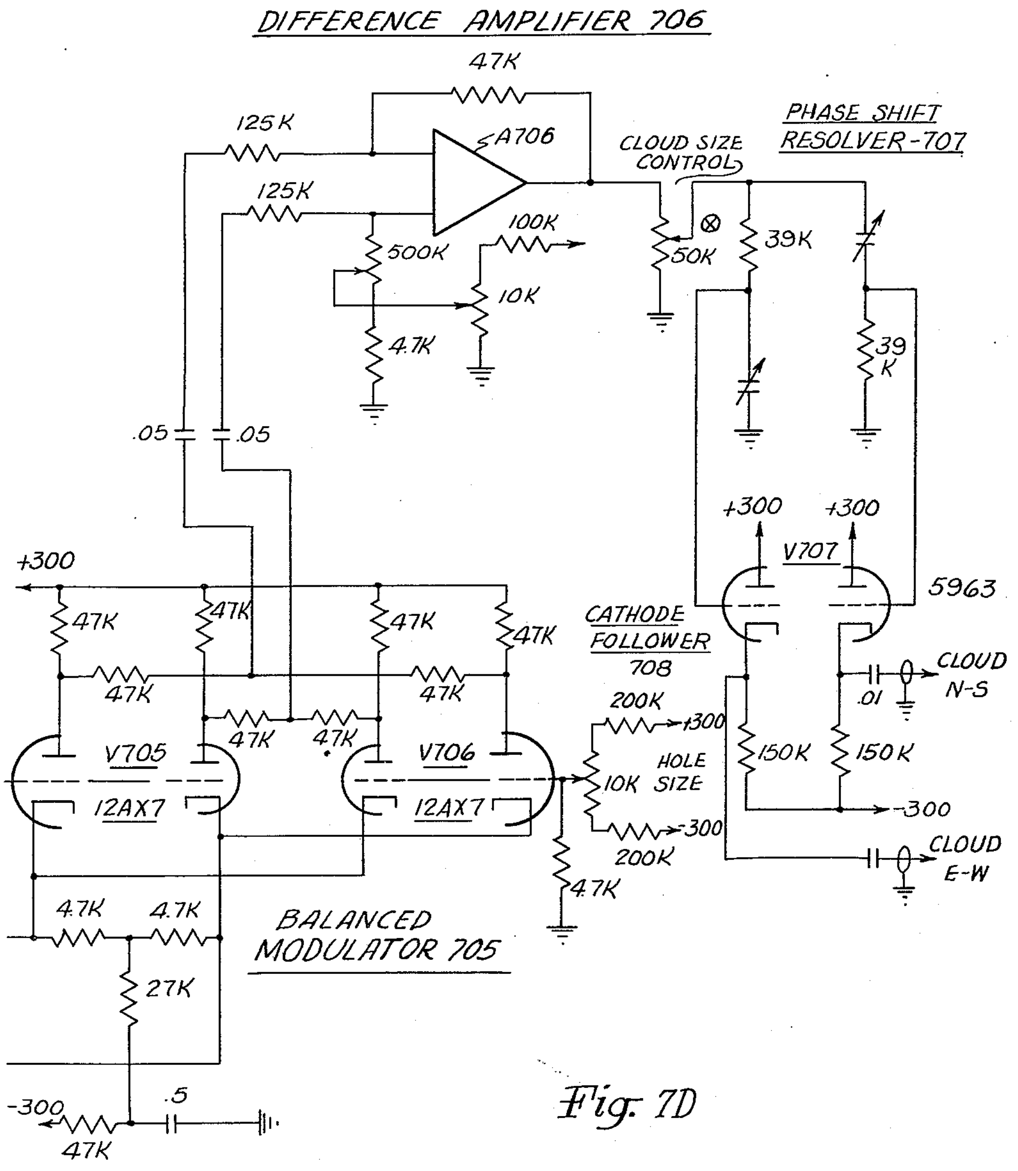

FIGS. 6A and 6B, which taken together comprise a single circuit diagram, illustrate the continuity of the particle slowness modulator, wind summers, particle slowness sweep generator, and height sweep generator components of the invention;

FIGS. 7A, 7B, 7C, and 7D show the cloud geometry mechanism of the invention in which;

FIG. 7A shows the cloud radius or cloud profile sweep generator;

FIG. 7B is a diagram illustrating a sweep trace corresponding to the profile of a typical model cloud;

FIGS. 7C and 7D, which taken together form a single circuit diagram, detail the circuit construction of other components of the cloud geometry mechanism;

FIGS. 8A–8D and 9A–9D are oscilloscope patterns showing visual representations of the outputs generated by various components of the computer of this invention.

*Preliminary considerations*

The determination of radioactive fallout involves the solution of mathematical equations containing variables representing physical conditions existing in the geographical environment in which the nuclear activity takes place. Moreover, the problem of determining and analyzing radioactive fallout is of such proportions that certain assumptions and simplifications must necessarily be introduced. These assumptions are not unusual in the field of fallout calculations and are similar to those generally employed in the "hand" methods of solution including those in which large scale digital calculating equipment is employed.

Initially it is assumed that a cloud of radioactive particles has formed consequent to a nuclear explosion and that such cloud has a definite shape and size for the duration of the calculation. At some instant considered as zero time for the calculations, the various kinds of particles at various locations in the cloud begin to settle, their final ground position being determined by the horizontal components of the winds acting on the particles as they descend from their initial position in the cloud to the ground. In this connection, no consideration is given to the fact that some particles may have begun to settle while other particles are still rising to a position of "initial" height.

In connection with the solution of the radioactivity fallout problem, in accordance with the principles of this invention, the model cloud is assumed to have a vertical axis of symmetry, vertical winds are neglected, large scale vortex motions caused by the forces developing the cloud and any effects on the wind pattern resulting from the energy of the burst are also ignored. It is also assumed that within the mushroom cloud there is a distribution of particles of varying size and radioactivity. At any particular height within the cloud the distribution is assumed to be uniform and to have circular symmetry.

Another basic assumption in the solution of the fallout problem in accordance with the principles of this invention is that the characteristics of the particles may be described by specifying a rate of fall as a function of altitude, and assigning a particular weighted value of radioactivity for each of the various ranges of fall rate and initial height. The meaning of such assumptions will become clear as the description proceeds.

Instead of rate of fall, a factor identified as a "slowness" variable, *s*, representing time of fall rather than rate of fall is employed. The slowness varies greatly with particle size. However, it is assumed that the relative times spent in the various altitude layers of the cloud are the same for all particles starting from the same initial height.

A further basic assumption is that the wind at each altitude level in the cloud is invariant over the entire area of fallout and does not change during the entire fallout time. Finally, it is assumed that no diffusion occurs during fallout, so that particles of a given size originating in any specified layer of the cloud maintain their relative positions with respect to each other as they fall. On the basis of such assumptions, the wind effects on particles having an initial position off the axis of the cloud can be readily calculated, the entire cloud layer (considering particles of one particle size range) being considered to move as a unit during the fallout.

In accordance with the principles of this invention, no distinction is made between the number of particles per unit volume and the activity per particle for particles of a given size (or slowness), $s$. To manifest the radioactive intensity of fallout a factor called activity, $\alpha$, is applied as an input to the computer.

While information concerning the value of such factors is classified and cannot be disclosed for a particular nuclear weapon, as will be seen, the machine according to this invention is so designed that certain function generators such as a radioactivity generator 106 (FIG. 1) can be set to introduce these values when available. When such values are obtained, it will be clear that the value of particle radioactivity can be expressed as a function of two independent variables.

$$\alpha = f(h,s) \qquad (1)$$

where $h$=height of particles in cloud at start of fall,
$s$=particle slowness factor typical of a given cloud particle,
$\alpha$=cloud activity factor, the total radioactivity for a given class of particles in a cloud layer.

Therefore the "cloud activity" (corresponding to fallout particle radioactivity) model is incorporated in the machine as a family of curves (see FIG. 8*d*) which are optionally under the control of the operator. No familiarity with the mathematical functions underlying the radioactivity factor is therefore necessary. Manipulation of control knobs provided on a radioactivity generator such as 106, FIG. 1 forming part of the computer, as will be described, enables the operator to introduce known values of radioactivity required for the solution of the fallout problem. As will be described, the activity function is set up to provide an output in terms of total activity in the cloud. The family of curves are adjusted with the factor, $h$ (altitude), as a parameter for 0, 20, 40, 60, 80, and 100 percent of the maximum altitude of the cloud. In this manner the instrument of the present invention provides sufficient flexibility to enable the solution of radioactive fallout problems involving a considerable range of weapon sizes. The radioactivity factor above discussed is generated in the radioactivity generator 106 to be described.

*Solution of the fallout problem*

Figure 2:
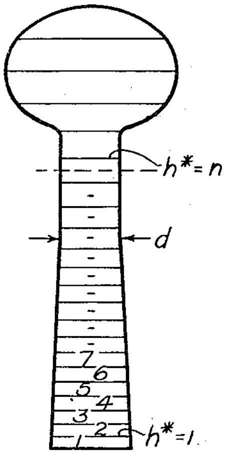
FIG. 2 is a representation of a model radioactive cloud illustrating certain principles employed in connection with the present invention.

The model cloud briefly referred to is symbolized in FIG. 2 of the drawings. As indicated, it is of mushroom shape and is optionally divided into horizontal layers or zones 1, 2, 3, etc., such that equal times are required for a specified particle to fall through successive layers. Because of variations in atmospheric density along the vertical, the actual thickness of each layer varies with height above ground level, as clearly indicated in FIG. 2. In the model cloud, each horizontal layer 1, 2, 3, etc., consists of radioactive particles ranging from a specified maximum to a specified minimum. The maximum particle may be defined as that particle which, due to its size, falls instantly to the ground. The minimum particle may be defined as that particle which requires a specified number of hours, for example 35, to fall an arbitrary distance, for example 34,000 feet.

In general, therefore, uniform horizontal layers or zones corresponding to specified particle sizes may be considered to exist at discrete heights above the ground in the model cloud. A radioactivity function, $\alpha$, is assigned to each of these particle sizes. Such radioactivity factor is a function of the particle size and the time required for the particle to fall to the ground. Since the time of fall is also related to particle size, a direct relation exists between radioactivity and the time of fall. The time of fall for each particle size may be designated by the term "particle slowness," $s$, and the radioactivity is therefore normally expressed as a function of such particle slowness as well as height, as indicated in Equation 1.

As previously mentioned, it is assumed that the final ground position of fallout particles is determined by such factors as (1) initial height in the cloud, (2) particle size or slowness of fall, (3) initial position of the particle relative to the axis of the cloud, and (4) the effect of the horizontal winds on the particles.

The solution of the fallout problem can therefore be rationalized on the basis of the following outlined precepts, all of which will be developed in detail as the description proceeds. The precepts are grouped into two general stages of solution. The first stage deals with particle location; the second with the weighting of such particle distribution for radioactivity. In the machine these operations proceed in synchronism.

*Stage I.—Particle location*

The computer of the present invention provides three scanning actions for determining the location of radioactive fallout particles. Such determination is performed in three steps as follows:

(1) A winds unit is employed which provides the ground location of the smallest particles initially located on the axis of the cloud and at various heights.

(2) A particle slowness modulator then extends the above scanning of particles to include particles of different sizes (or slowness time), ranging downward to "zero slowness." The latter scanning is made to occur at a relatively high sweep rate (i.e., 800 c.p.s., as will be described) so that particle height can in effect be considered quasi-constant during one scan through a full range of particles having various slowness times.

(3*a*) The scan is then extended to include particles originating off the axis of the cloud. This is accomplished in a cloud raster generator which superposes a rapid, tight spiral covering the location of particles within a circular (cross-sectional) area with respect to the axis of the cloud.

(3*b*) The diameter of such spiral is continuously controlled by a cloud profile (or radius) generator which in turn is continuously driven by a sweep voltage corresponding to cloud height, $h$. The action of the cloud raster generator is made sufficiently rapid so that the values of the particle slowness factor, $s$, and height, $h$, will not change significantly during generation of each spiral raster. The above-referred-to cloud raster and cloud profile generator will subsequently be identified as the cloud geometry mechanism.

*Stage II.—Weighting for radioactivity*

This step in the computation is performed concurrently with Stage I. A radioactivity generator 106 provides a voltage output representing the relative radioactivity to be associated with the class of particles being analyzed. As has been briefly mentioned and as will be described in more detail, the radioactivity factor, $\alpha$, is expressed as a function of particle slowness, $s$, and height, $h$, which are treated as independent variables. The radioactivity factor, $\alpha$, employed in the computer is therefore treated as an arbitrary function of two independent variables. As will be made clear, such factor is generated in a mechanism which enables the operator to optimally select any practical degree of arbitrariness of such factor.

The manner of implementing the above-outlined precepts can now be described in greater detail.

The principal factor affecting radioactive fallout concerns the effect of winds on the mushroom cloud. While falling, the particles move laterally with the horizontal velocity of the wind. As has been previously mentioned, a typical mushroom cloud model, such as is represented in FIG. 2 may be divided into horizontal layers representing altitude zones such that equal times are required for a specified particle to fall through successive layers. Because of variation in atmospheric density along the vertical, the actual thickness of each layer or zone varies with height above ground level. In the model cloud, each horizontal layer consists of radioactive particles ranging from a specified maximum to a specified minimum. The maximum is assumed to be that particle which, due to its size, falls instantly to the ground. The minimum is that particle which requires a specified time to fall from a designated height. A radioactivity function, $\alpha$, is assigned to each particle size. The radioactivity factor is therefore considered as a function of particle size and the time required for the particle to fall to the ground. Moreover, since such time of fall is also related to particle size, a direct relation exists between radioactivity and time of fall. In connection with the present invention the time of fall for a particular particle size is designated by a particle-slowness factor, $s$, and the radioactivity factor, $\alpha$, is therefore normally expressed as a function of such particle slowness, as previously indicated.

Returning to a consideration of the effects of winds on particle fallout, such effects can be determined by analyzing the various displacements caused by the wind in each of the referred-to horizontal layers or altitude zones 1, 2, 3, etc. (FIG. 2).

The well-known wind hodograph principle is employed in analyzing and determining the effects of the winds on particle fallout displacement. The horizontal displacement of a particle, falling from an initial height, $h$, will be modified only by those winds existing at height levels below, $h$. The displacement of a specified particle size will be a function of its associated particle slowness value, $s$, and the wind velocities and directions in the various referred-to altitude zones. In the following discussion the initial height of any particle will be designated as $h$. In addition, a factor $h*$ may be defined the value of which varies with the altitude of the cloud.

Figure 3:
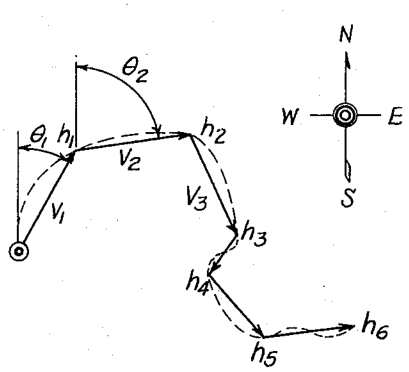
FIG. 3 is a wind hodograph.

FIG. 3 is a wind hodograph or displacement diagram of the type normally employed to indicate the horizontal projection of the path of motion of a weather balloon. In the diagram, V represents the average speed and $\theta$ represents the average wind direction measured clockwise from north in any particular layer or altitude zone. The subscripts attached to V and $\theta$ correspond to the identity of the altitude zone. The dotted line indicated in FIG. 3 represents the horizontal projection of the actual path of a weather balloon having a constant rate of ascent. If an appropriae altitude scale is marked along such a curve, a vector such as $V_2$ joining altitude points $h_1$ and $h_2$ would represent the direction and magnitude of the average horizontal wind exerted on the balloon as it rises completely through the layer or altitude zone between the heights $h_1$ and $h_2$. It will be obvious that in the case of a descending particle the hodograph would be drawn in a reverse sequence, starting with V instead of $V_1$. However, the total relative displacement is the same. The horizontal displacement of a particle while it falls from an altitude $h_2$ to an altitude $h_1$ may be obtained by multiplying the corresponding wind vector $C_1$ by the time required for such particle to fall through the zone. A particle falling from the top of the third layer or zone to the ground would therefore be displaced in an east-west direction by an amount $$X=s[V_1 \sin \theta_1+V_2 \sin \theta_2+V_3 \sin \theta_3 \ldots] \quad (2)$$

where $s$ is the slowness for such particle, that is, the time it takes that particle to fall any one height interval. A similar cosine expression defines the north-south component Y of the particle displacement.

It is apparent that there is an approximation introduced by assuming a finite number of wind layers, since the referred-to dotted line path indicated in the wind hodograph (FIG. 3) deviates from the straight-line vectors joining the layer boundary points $h_1$, $h_2$, etc. However, no error is introduced for the particles falling completely through a given layer, since the total effect of the wind is specified correctly. There is a small error, within a layer or zone only, for those particles having an initial height within a particular layer or zone, since the analogue computer of this invention interpolates along a straight line in space.

In accordance with the first of the previously enumerated precepts, the displacements of particles having an origin along the vertical axis of the cloud are initially determined and the present portion of the analysis is limited to such particles originating along the vertical axis of the cloud. It will also be recalled that the second enumerated precept is concerned with different sized particles having different values of slowness times.

For example, consider five different particle sizes, each having corresponding fall times, $t_0$, $t_1$, $t_2$, $t_3$, and $t_4$ where $t_0$ is the time required for the heaviest particle to fall and $t_4$ is the time required for the lightest particle to fall, and assuming as previously stated that the heaviest particle size requires zero time to fall, then $t_0$ is equal to 0.

Considering then particles of different particle sizes, all originating at a particle height $h_1$ along the vertical axis of the cloud, the final total displacement of all such particles, regardless of size will be the same but each will be displaced different amounts with respect to the cloud axis. Accordingly a straight line such as $h_1$ extending radially from the axis designated as O in FIG. 5A can be drawn that will represent the locus of the ground positions of the five referred-to particles of different size. These points are represented in FIG. 5A by the designations O, $A_1$, $A_2$, $A_3$, and $A_4$ respectively, all plotted along the line designated as $h_1$ (corresponding to a given altitude).

In a similar manner, particles originating at an altitude $h_2$ along the vertical axis of the cloud will assume ground positions having a locus represented by the line $h_2$, the points O, $B_1$, $B_2$, $B_3$, and $B_4$ corresponding to the positions of the particles having increasing fall times. FIG. 5A shows the locus for four different assumed altitudes of origin. For purposes of description, the constant-height locus lines $h_1$, $h_2$, $h_3$, $h_4$, etc. may be referred to as spokes since the computed of this invention manifests such particle distribution as a series of radial lines or spokes (see FIG. 8C) as one manifestation.

Now the third of the enumerated Stage I precepts can be considered. It will be recalled that such precept is concerned with particles having not only different slowness time but also having an origin of fall which is laterally displaced from the vertical cloud axis.

Consider the same four exemplary height intervals and assume there exists a uniform horizontal distribution of each of the referred-to five particle sizes at each such height interval or altitude zone. Let it also be assumed that the boundaries of distribution are circular and that the diameter of these circular distribution areas are proportional to the diameter of the cloud at the four specified altitudes $h_1$, $h_2$, $h_3$, and $h_4$. Any zone in the cloud can then be considered to include five horizontal circular particle sheets (one for each particle size) located at each of the four height intervals. Assuming that each such particle sheet preserves its shape and distribution as it falls to the ground, a representation such as is depicted in FIG. 5B can be visualized.

In FIG. 5B, O represents the vertical axis of the cloud while the various circles having centers $A_1$, $B_3$, etc. along each of the radial spoke lines $h_1$, $h_2$, $h_3$, and $h_4$ conform to the circular particle distribution pattern.

As has been previously described, the radioactivity contribution of a particle at ground level is a function of its size and initial height in the cloud and such radioactivity factor, $\alpha$, can be expressed at a function of two independent variables as indicated in Equation 1.

Therefore a total radioactivity contribution can be assigned to each of the circular areas indicated in FIG. 5B and the total ground level radioactivity resulting from particle fallout may then be determined by summing the activity on the sections at selected points on the ground. At this point in the description it may be briefly stated that such summing is actually employed in the apparatus of this invention by integrating the time sequence of brightness on any sample area displayed on the cathode-ray tube 111 of the computer with a photometer or other suitable light integrating device.

The method of solution has been indicated by generalized objectives. The specific manner in which the mechanism of the present invention implements these objectives can now be detailed.

The elements will be described in the order in which they contribute in implementing the previously outlined precepts.

The technique employed in accordance with the principles of this invention to obtain the final X and Y ground coordinate positions and associated radioactivity of fallout particles contemplates the production of continuously varying electrical voltages proportional to the previously referred-to factors, $s$ (particle slowness factor) and $h^*$ (altitude expressed as time of fall), the scanning of such voltages over the full ranges of $s$ and $h^*$ and the simultaneous development of the corresponding fallout positions and radioactivity as voltage signals. The X and Y voltage signals are employed to deflect the beam of a cathode-ray tube, and the radioactivity voltage signal simultaneously modulates the intensity of the beam. The display on the cathode-ray tube then provides a visual representation of the fallout of radioactivity particles, the luminance or brightness of the representation representing the total intensity of fallout at a particular geographical location, which can readily be measured with a light-integrating device, or observed visually for qualitative interpretation.

Figure 1:
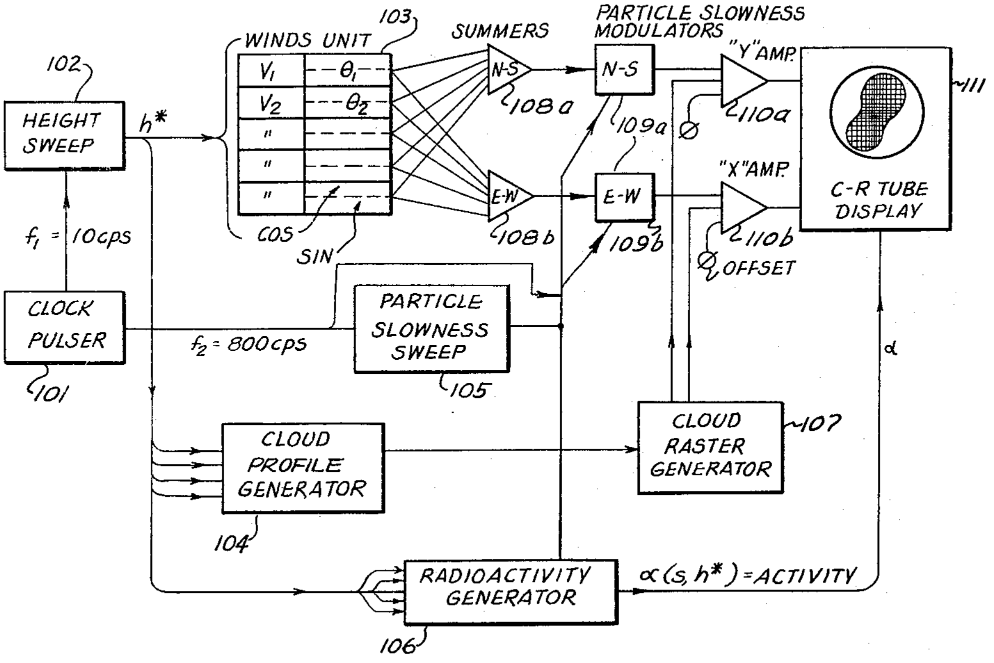

FIG. 1 is a block diagram of the over-all computer of this invention for implementing the previously described operations necessary to the solution of a fallout problem. A clock pulser 101 controls the cycle of operation of the computer. The clock pulser 101 provides outputs of 10 and 800 c.p.s., as indicated. The 10 c.p.s. clock pulses are applied to a height sweep generator 102 which produces a sawtooth voltage output rising linearly with time and repeated each 1/10 second. Such generator defines and represents, for each sweep thereof, a continuous sampling of the various altitude zones (indicated in the model cloud of FIG. 2) throughout the entire height of the cloud. A complete problem solution is completed by the mechanism of this invention during each such sweep cycle generated by height sweep generator 102.

The sweep voltage (representing the variable $h^*$) from height sweep generator 102 is applied to a winds unit 103. The winds unit 103 is the mechanism for implementing the first previously enumerated precept in the outlined solution; namely, the determination of particle location of those particles having an initial position in the cloud at a particular height but always on the vertical axis of the cloud. The winds unit 103 produces output voltage signals proportional to the X and Y displacements of a standard particle (one having unit fall time) as it is affected by winds having various magnitudes and directions in each of the altitude zones through which the particle falls. The winds unit 103 has a plurality of similar sections corresponding in number to the altitude zones 1, 2, 3, etc. in the model cloud, in this instance, by way of Example 20. Each section of the winds unit comprises a circuit such as is detailed in FIG. 4A. FIG. 4B diagrammatically illustrates the operation of the various sections of the winds unit. The lightest particles, that is those having the largest particle slowness factor, $s$, are first considered. It will be recalled from the previously outlined precepts that the solution is later modified to include heavier fallout particles, and then to include the particles whose origin is displaced from the vertical axis of the cloud.

The winds unit 103 is a function generator having a plurality of identical sections corresponding in number to the number of altitude zones into which the model cloud (FIG. 2) is divided. The twenty sections are sequentially activated as the $h^*$ input sweep voltage rises to its maximum value of 100 volts and the outputs of each section are continuously accumulated in summers 108*a*, 108*b* (FIG. 1). At the start, when the value of $h^*$ voltage is zero, none of the winds unit sections produces an output.

Figure 4A:
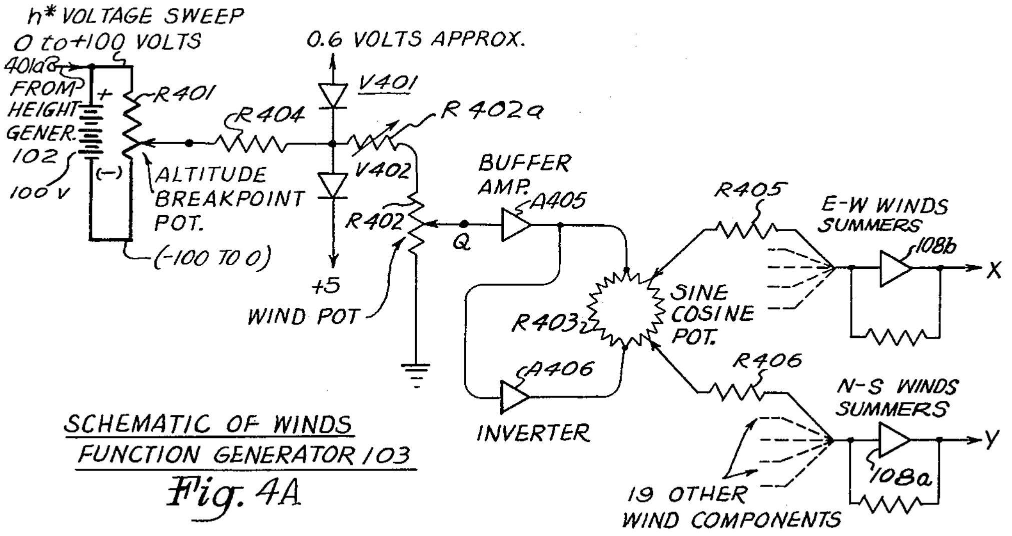
FIG. 4A is a circuit schematic showing the construction of a winds unit component.
Figures 4B, 4C:
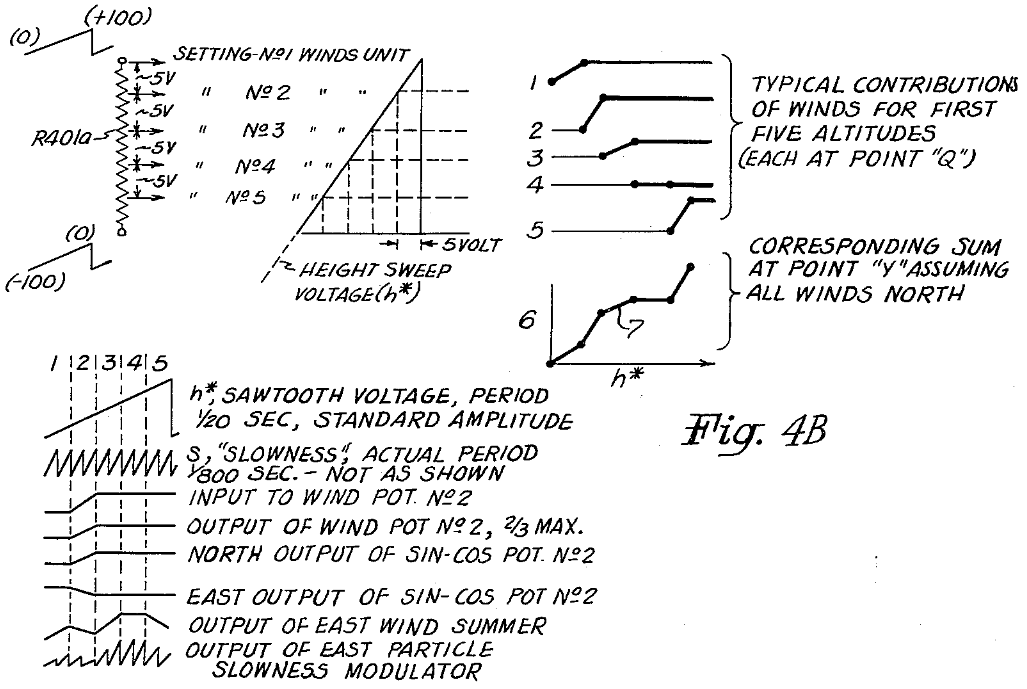
FIGS. 4B and 4C are diagrams illustrating the operation of the winds unit and other mechanisms of the invention.

Each section of the winds unit as shown in FIG. 4A comprises an altitude breakpoint potentiometer R401 having an input terminal 401*a* connected to the output of the height sweep generator 102 (FIG. 1). The other terminal of the potentiometer R401 is connected to the negative terminal of a 100-volt floating power supply as shown. As the height sweep voltage $h^*$ applied to terminal 401*a* varies between 0 and its maximum amplitude of +100 volts, the opposite terminal of the potentiometer will be energized with a tracking voltage varying between −100 and zero volts. The slider of the breakpoint potentiometer R401 is connected through a current-limiting resistor R404 to a wind magnitude signal attenuator such as the potentiometer R402. The input to potentiometer R402 is connected to different electrodes of a first-initiating diode V401 and a second output limiting diode V402. The opposite electrodes of the diodes are connected to fixed bias sources of nominally 0.6 and 5 volts, respectively. The 0.6 volt bias on diode V401 is adjusted to provide a true starting potential of 0 volts, and corrects for the forward drop in the diode. Similarly, the diode V402 is actually biased at about 4.2 volts to provide for forward drop in that diode, so that correct breakpoint intervals of 5 volts are actually obtained.

The adjustable element of the wind potentiometer R402 is connected to a sine-cosine potentiometer R403 through a buffer amplifier A405 and an inverter amplifier A406. The respective rectilinearly related outputs obtained across the sine-cosine function resolving potentiometer R403 in each section of the winds unit are connected to the E—W and N—S winds summers 108*a*, 108*b* through a respective one of the plurality of summing resistors R405, R406. The wind summers are also shown in FIG. 1.

An adjustable series resistor R402*a* is provided in series with wind potentiometer R402 to "weight" the winds in the various altitude zones. It will be resolved from FIG. 2 that the various altitude zones forming the vertical extent of the model cloud have varying thicknesses, depending upon the cloud height, to compensate for the effects of air density on particle fall. In connection with the winds function generator of FIG. 4A, it is practicable to compensate for air density by reducing the effective magnitude of the wind in a particular altitude zone. That is, for the purposes of the wind computation, instead of dividing the cloud into unequal altitude zones, the wind component in each zone is weighted by compensating the magnitude of the wind to allow for the effect of air density on the particle fall in the respective zone. The variable resistor R402*a* in each section of the winds function generator provides a convenient means for effecting such weighting.

In order to explain the operation of the winds unit circuit shown in FIG. 4A, consider the diagrammatic illustration in FIG. 4B. In FIG. 4B, the voltage divider R401*a* symbolizes all of the breakpoint potentiometers R401 provided in each of the winds unit sections. Actually, only one tap is connected to each potentiometer. The waveforms of both the *h** and *h*–100 signals applied across each of the potentiometers R401 are also indicated alongside the two terminals of the representative breakpoint potentiometer R401*a*. The settings of each of the altitude breakpoint potentiometers R401 is indicated by arrows connected to points on the representative breakpoint potentiometer R401*a* corresponding to the positions of adjustment of the actual breakpoint potentiometer in each section of the winds unit. Accordingly, the breakpoint potentiometer of the first section of the winds unit will be set at a zero-voltage value as indicated by the uppermost arrow on the voltage divider R401*a* in FIG. 4B. Similarly, the breakpoints in each of the subsequent sections will be set at 5-volt intervals corresponding to like amplitude increments forming the total amplitude of the 100-volt *h signal. Five of such breakpoint settings are symbolized in FIG. 4B by the 5 arrows connected to the potentiometer R401***a*.

It will therefore be apparent that as the *h** voltage (together with its "slave" (*h*–100)) is cyclically applied across the altitude breakpoint potentiometers R401 in the various sections of the winds unit, each section will in effect receive in sequence only a 5-volt increment of the *h** signal. In other words, each section will be energized by an increment of the 100-volt *h** signal having an amplitude varying between 0 and 5 volts, each of such increments occurring progressively at points of increasing amplitude along the *h signal curve 7** in FIG. 4B.

When the value of the *h voltage increment seen by each section is zero, the lower diode V402 which is normally biased to +5 volts as described, will be nonconducting. The upper diode V401 will be conducting and therefore sets the input to wind potentiometer R403 at zero volts. As the voltage rises above zero, both diodes will be nonconducting and a voltage will therefore build up across wind potentiometer R402 reaching a maximum value of +5 volts before being limited by forward conduction of the lower diode V402. Considering the first section of the winds unit, such voltage build-up can be represented by the curve labeled 1** in FIG. 4B. As indicated, the first section when energized as described builds up to a maximum value of 5 volts and remains at such value for the duration of a cycle as defined by the *h sweep voltage. During such build-up time in the first section, the remaining sections are not energized because of the respective settings of their breakpoint potentiometers, each of which, as has been described, can see only a voltage increment of 5 volts. The operation of each section of the winds unit is the same except that energization of each subsequent section is initiated after the immediately preceding section has responded to a 5-volt increment of the height sweep signal 7**.

The wind potentiometer R402 in each section provides means for adjustably attenuating the magnitude of the wind signal commensurate with the known value of the wind in the particular altitude zone concerned. That is, the 5-volt increment will correspond to a wind force of maximum magnitude, winds of lesser force being represented by wind signal voltages which are a function of said 5-volt amplitude increment. For example, curves 3 and 4 indicate that the winds in the corresponding altitude zones differ from those in the zones represented by curves 1 and 2. Curve 6 in FIG. 4B shows the cumulative output obtained from the five referred-to winds unit sections when added in the winds summer 108*a*, 108*b*. In actual practice, the console housing the winds unit 103 is provided with a plurality of control knobs, one set for each winds unit section, corresponding to each altitude layer. The knobs which control the wind potentiometer R402 are suitably calibrated in knots, while the knobs for adjusting sin-cos potentiometer R403 are suitably calibrated in compass bearings representing the direction of the true wind. Since the inputs to the resolving potentiometer R403 represent wind magnitude, the outputs from the resolver represent the sine and cosine functions thereof which, in accordance with Equation 2 previously developed, correspond to the E—W and N—S coordinates respectively of particle displacement. Such voltages are each fed into corresponding E—W and N—S wind summers 108*b*, 108*a* and through the summing resistors R405, R406, and the outputs therefore represent the E—W and N—S sum of the twenty assumed wind components. It will be clear from FIG. 1 that each of the twenty winds unit sections are connected to the wind summers 108*a* and 108*b*.

It is to be understood that the particular number of wind sections employed, as above described, is exemplary. As many wind units as is desirable may be used; for example, 10 wind units at 10-volt intervals or 40 units at 2.5-volt intervals.

Figure 8A:
Figure 8D:
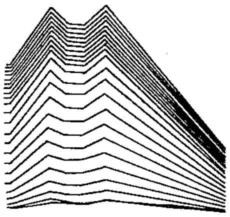
Figure 8B:
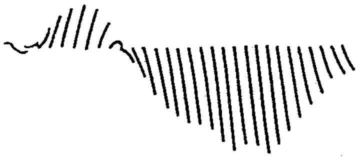

FIG. 8A is an actual oscillograph trace of the output from the N—S wind summer 108*a* versus *h** voltage. When the particle slowness factor, *s*, is then combined, as will be described, a series of traces, as shown in FIG. 8B, will be obtained having an envelope corresponding to FIG. 8A. These individual sawtooth voltages, are the N—S components of the spoke pattern alluded to previously.

The second of the previously outlined precepts listed under stage I (Particle Location) concerns the solution of the portion of the problem relative to particle slowness. It will be recalled that particles of different sizes have different slowness of fall, *s*. The particles slowness factor, *s*, is generated in the particle slowness sweep generator 105 (FIG. 1).

The particle slowness sweep generator 105 is clock controlled by the clock pulses 101 at a frequency of 800 c.p.s. Such relatively high rate of sweep (as compared to the 10 c.p.s. sweep rate of the cloud height generator 102) is selected so that the height of the particle can be considered as a quasi-constant during each scan of the height sweep through a full range of particles of various sizes. The specific circuit construction of the particles slowness sweep generator 105 is detailed in FIG. 6B.

FIGS. 6A and 6B taken together form a single circuit diagram detailing the construction of various of the components in the computer.

*Particle slowness sweep generator 105 (FIG. 6B)*

An 800-c.p.s. signal from clock pulser 101 is applied at terminal 600 of particle slowness sweep generator 105 (FIG. 6B) and is used to trigger a gating pulse generator circuit comprising tube V600.

An operational amplifier A600 is employed as an integrator. The operational amplifier A600 is a concept familiar to the analog computer art as described in "Analog Computers" by Korn and Korn. The particular operational amplifier employed may be of a type manufactured by George A. Philbrick Researches, Incorporated, and identified as GAP/R Model K2–W operational amplifier. No further details concerning the operational amplifiers such as A600 employed in connection with the present invention are considered necessary, since their characteristics and applications in connection with computers are generally well known. A concise explanation is contained in the referred-to text. The operational amplifiers employed in the present application are in two types, K2W and K2X, differing only in that the K2X can produce output excursions of ±120 volts while the K2W is limited to about ±60 volts.

The amplifier A600 is energized from a source of fixed potential as indicated and generates a linearly increasing output voltage. A type 5687 tube V601 is employed to reset the output of the amplifier A600 to zero. Specifically, the pulses generated by gating pulse generator tube V600 function to periodically energize the resetting tube V601 800 times per second. Tube V601 when energized in effect short-circuits the output of the integrating amplifier A600 to its input, such a feedback path forcing the output to zero. There results a linear sawtooth wave output from the integrator having a recurrence rate of 800 c.p.s.

The output signal, *s*, from the particle slowness generator 105 is applied through output terminal 601, FIG. 6B, to the radioactivity generator 106, as indicated in FIG. 1.

As previously indicated, information concerning the radioactivity of the particles is classified, but by providing a function generator which will furnish an output of two arbitrary variables, it will be apparent that any desired value of $\alpha$, which has been previously defined in Equation 1 as being a function of H, height of particles in the cloud, and S, particle slowness factor, can be generated. The radioactivity generator 106 may therefore be readily implemented by a function generator which is commercially available for use as an analogue computer component. Particularly a Model GAP/RF2V function generator manufactured by George A. Philbrick Research Incorporated and described in their bulletin of the same title may be used. Alternately, a function generator described in one of the applicant's copending application, Serial No. 688,384, filed on October 4, 1957, which application identifies the present one, may be used as the radioactivity generator 106. In any event, such function generator can readily be adjusted as is well known in the art, to provide outputs having the characteristics represented by the set of curves in FIG. 8D. It will be recalled that in one step of the solution of the fallout problem, the wind effects on particles of different sizes originating at a specific height on the vertical axis of the model cloud result in particle ground distribution along radial constant altitude lines $h_1$, $h_2$, etc. as illustrated in FIG. 5A. The output from the particle slowness sweep generator 105, just described, is effectively combined with the winds unit (103) output in the particle slowness modulators 109*a*, 109*b* (FIG. 1) to account for intermediate fallout positions of different size particles along such radial lines. Specifically the particle slowness modulators each produce a spoke-pattern display representative of the locus lines shown in FIG. 5A, in the manner now to be described.

*Particle slowness modulators 109a, 109b (FIG. 6A)*

The construction of the particle slowness modulators 109*a*, 109*b*, is detailed in FIG. 6A. Both modulators are identical in construction and only the N—S modulator 109*a* is therefore shown and described in detail. It will be noted that the construction of wind summer units such as N—S summer 108*a* is also indicated in such portion of FIG. 6A. As indicated in FIG. 6A, each of the wind summers can consist of a model K2W operational amplifier, such as A601. The particle slowness modulator 109*a* further includes a spoke generator mechanism comprising tube V602 and another Model K2W operational amplifier A602.

In actual practice as shown in the detailed diagram of FIG. 6, the 800 c.p.s. triggering signals from the clock pulser, and not the output *s*-signals thereof from the particle slowness modulator, are in fact applied to the particle slowness modulators. The actual connections employed are therefore indicated in solid lines in FIG. 1, while the functional result is shown in broken lines. The reason for such practice is that the function of the particle slowness modulators 109*a*, 109*b* is to productively combine the outputs of the winds unit 103 with the factor *s* generated in particle slowness sweep 105. However, as will be described, the circuit design is such as to eliminate the need of an electronic multiplier for this purpose.

Specifically, by combining the triggering signals from the clock pulser 101 with the breakpoint signals obtained from the wind summers such as 108*a*, a product is directly obtained commensurable with that which would be produced by multiplying the *s* output signal from particle slowness generator 105 and the output of the wind summer. To explain such procedure, consider the operation of the spoke generator circuit V602, A602 portion of the particle slowness modulator 109 as shown in FIG. 6A. The 800 c.p.s. signal from pulse generator V600 (FIG. 6B) is applied to a type 5687 resetter tube V602. The operational amplifier A602 instead of being energized from a source of fixed voltage, as in the case of amplifier A600 previously referred to, is connected to the output voltage of the wind summer 108*a*. The wind summer signal, it will be recalled, has a relatively slowly varying amplitude waveform of the type indicated as curve 6 at the bottom of FIG. 4B. The resulting output obtained from operational amplifier A600 therefore will have a linear rate of increase determined by the applied wind summer signal. The reset tube V602 periodically reduces the output of operational amplifier A602 to zero at an 800 c.p.s. repetition rate. Hence the amplifier generates a spoke representing trace signal at a like 800 c.p.s. rate, the amplitude or extent of such trace signal being a function of the wind summer signal. As has been described, the generation of the wind summer signal assumes a fallout particle having the slowest fall time. Therefore, since the output voltage of the amplifier A602 starts at zero and its rate of increase is determined by the wind summer signal, such output voltage will represent the position or locus of particles ranging from an instantly falling particle to one having the slowest fall time.

Figure 8C:
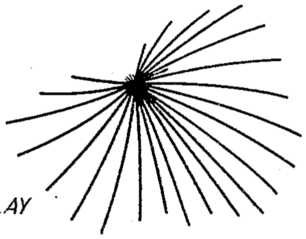

It will be apparent therefore that the spoke generator portion of the particle slowness modulator, as described, will generate a sawtooth signal having an 800 c.p.s. repetition rate, and the amplitude of each tooth will be determined by the voltage breakpoints in the wind summer signal. The resulting manifestations presented in the display tube 111 will therefore be in the nature of a spoke pattern, the radial extent of each spoke varying commensurate with the applied wind summer signal to provide a display representing the locus of fallout particles of different sizes as described in connection with FIG. 5A. A typical such representation is indicated in FIG. 8C. FIG. 8C shows a typical spoke pattern display as it would appear on the display tube 111 when neither the radioactivity intensity modulator nor the cloud geometry mechanism are in operation. Each of the resulting radial lines or spokes represents the locus of fallout particles of various kinds up to the slowest falling type as has been previously explained in connection with FIGS. 5A and 5B. It is apparent from the above explanation that since the sweep amplitudes generated by the spoke generator circuit are voltage controlled, the resulting modulations of its sawtooth voltage output provides a signal commensurate to that which would be obtainable in a conventional manner by multiplying the output of the wind summers 109 and the *s*-signal from the particle slowness generator 105.

The first two precepts under stage I (Particle Location) are implemented in the above manner. That is, the displacement of particles of different sizes originating on the axis of the cloud caused by winds has been determined and is manifested as indicated in FIG. 9.

Implementation of the third (3*a*, 3*b*) enumerated precept under stage I of the previously outlined solution is accomplished by the cloud geometry components of the computer. The cloud geometry components include cloud radius generator 104 and cloud raster generator 107. The constructions of both such units is detailed in FIG. 7A.

*Cloud geometry mechanism (FIG. 7)*

As previously described, steps 3*a* and 3*b* in stage I of the previously outlined solution precepts of the fallout problem require extension of the scan to cover particles originating off the vertical axis of the cloud. For this purpose the computer employs a cloud geometry mechanism comprising the cloud radius or cloud profile generator 104 and cloud raster generator 107 indicated in FIG. 1. The specific construction of such computer components are detailed in the circuit diagrams of FIGS. 7C–7D.

*Cloud diameter or profile generator 104 (FIG. 7A)*

The construction and operation of the cloud profile generator 104 can best be explained by first briefly considering the representation of FIG. 7B. As indicated in this figure, the outline of a typical mushroom cloud can be represented by a trace having a vertical displacement representing cloud height and a horizontal curve the amplitudes of which at any given height correspond to the radius of the mushroom cloud. The radius of the munshroom portion, for example, is represented by an amplitude corresponding to 50 volts, while the stem portion has a radius corresponding to an ampliude of 10 volts. The height, as is apparent in FIG. 7B, is represented by an amplitude of 100 volts which corresponds to the assumed amplitude of the previously referred-to height sweep voltage $h^*$ generated by height sweep generator 102.

The cloud profile generator 104 provides signals which result in a profile trace corresponding to FIG. 7B in response to the applied $h^*$ sweep voltage. Referring to FIG. 7A, the profile generator comprises eight sections 700 each including a circuit identical to that indicated within the broken line rectangle. Each such section has output terminals 708, 709, which are connected in parallel, respectively, to corresponding Model K2X operational amplifiers A700 and A701, the latter serving to sum the outputs of each of the eight units. Each section is also provided with an input terminal 710 to which the referred-to $h^*$ sweep voltage from the cloud height sweep generator 102 is applied. Such voltage varies linearly between 0 and +100 volts as previously described. Each of the sections comprises a normally balanced bridge circuit R702 connected to the output terminals 708, 709 and the input terminal 710. One arm of the bridge is connected through an adjustable "slope" potentiometer R701 to the anode of a diode or asymmetrical conducting device such as diode V700. The other electrode is connected through a "breakpoint" potentiometer R700 to a stable voltage source as indicated.

It will be noted from a consideration of the display pattern illustrated in FIG. 7B that the cloud profile can be broken down into a series of, for example, eight straight line segments or traces, as indicated by the dots or break points in FIG. 7B. The setting of the breakpoint potentiometer R700 in each of the sections 700 determines the points at which the line segments indicated in FIG. 7B join; that is, the points at which the output voltage generated by the profile generator progresses along line segments of different slopes. The setting of the slope potentiometer R701 in each of the sections determines which of the unbalanced currents feeding into terminals 708, 709 of the bridge R700 is the greater and therefore determines the magnitude and sense or polarity of the sloped portions of the referred-to segments (FIG. 7B).

Since each of the eight referred-to sections 700 of the cloud profile generator 104 are connected to a fixed source of potential of, for example +105 volts, the breakpoint potentiometers R700 in each section can readily be individually adjusted so that the associated bridge R702 will be energized by an incremental portion of the applied input ($h^*$) voltage separately from the seven remaining networks. That is, it is obvious that the breakpoint potentiometer R700 for the first section can be initially set so that unbalanced currents can flow in the bridge arms when the $h^*$ voltage applied to input terminal 710 is some predetermined increment of the total $h^*$ voltage. Each subsequent section can likewise be adjusted so that current flow in its respective bridge is initiated at corresponding higher discrete increments of the $h^*$ voltage. The point at which each section is so initiated corresponds to the breakpoints diagrammatically indicated in FIG. 7B. In this manner, a voltage is obtained at each of the output terminals 708 and 709 in each of the sections 700, which is a fractional part of that input voltage for which the bridge network section has been adjusted. Each such output voltage is applied to a respective one of the operational amplifiers A700 or A701. Amplifier A700 inverts its signal and in turn drives the other input of amplifier A701. The latter amplifier thus serves as a difference amplifier, the output of which represents the difference between the two sums of bridge currents at points 708 and 709. The output is therefore a function of time and may be positive, negative, or zero at any particular instant. The effect is a linear output voltage, which, when swept by the $h^*$ voltage, will be represented as a variable slope, the slope being determined by the variation of the ratio of the arms of the bridge due to the adjustment of slope potentiometer R701. Since the amplifiers A700, A701 accumulate the outputs of all of the eight sections 700 of the cloud profile generator, there is obtained in effect an arbitrary function output voltage having eight variable breakpoints and eight variable slopes. Since the amplitude of the input height sweep voltage varies linearly from 0 to +100 volts, it follows that such function voltage can be manifested as a function of time and cloud height or, in other words, as a trace corresponding to the profile previously described in connection with the representation of FIG. 7B. It will be apparent from the above description that the slope of the output obtained from each successive section 700 of the cloud profile generator is measured relative to the slope of the output obtained from a preceding section. That is, the slope from any such successive section represents an accumulation of the slopes obtained from the preceding sections.

*Cloud raster generator 107 (FIGS. 7C, 7D)*

The second component of the cloud geometry mechanism comprises the cloud raster generator 107 which is connected to the output of the profile generator 104, as shown in FIG. 1. The construction of such unit is detailed in FIGS. 7C, 7D, which, taken together comprise a single circuit diagram. The purpose of the cloud raster generator is to provide signals which, when applied to the deflection system of the display tube 111 will result in a spiral raster which "spreads" the spot representing the computed fallout portion of a particle. It will be recalled that step 3*a* (stage I) of the previously outlined precepts requires extension of the scan to include particles originating off the axis of the cloud by superimposing a rapid, tight spiral covering the location of particles within a circular cross-sectional area with respect to the axis of the cloud.

The diameter of such raster is a function of the cloud diameter, which, as explained in connection with the description of the profile generator is in turn a function of the height of the cloud. The input to the cloud raster generator is the cloud radius or profile voltage as obtained from the cloud profile generator 104. Such voltage in effect is a quasi-static time varying voltage representing the cloud diameter.

Referring to FIGS. 7C and 7D, the raster generator 107 comprises an integrator 707, voltage comparator 702, gate pulse generator 703, oscillator 704 (FIG. 7C), balanced modulator 705, difference amplifier 706, phase shift network 707, and output cathode followers V707 (FIG. 7D). The input voltage corresponding to the function voltage obtained from cloud profile generator 104 is applied to the integrator 707 and voltage comparator 702 components in FIG. 7C.

The integrator circuit 707 comprises operational amplifier A702 employed as an integrator together with a type 5963 reset tube V707. The integrator operates in a characteristic fashion as previously described from the indicated fixed voltage source to produce an output signal the amplitude of which increases linearly with time. When the amplitude of the output voltage reaches a magnitude equal and opposite to the applied input voltage representing the referred-to cloud radius, the combined action of the voltage comparator 702 and gate pulse genertaor 703 generates a pulse which operates the integrator reset tube V707 to force the output of operational amplifier A702 back to zero. The rate of rise of the output voltage obtained from integrator 707 has a predetermined value and the repetition rate of the reset cycle varies inversely with the amplitude of the applied cloud radius voltage. In other words, the integrator will produce a series of sawtooth voltages of the varying amplitudes, the periods between the sawteeth of which will be the same for a given cloud radius but which will vary inversely with changes in the cloud radius.

The output of the integrator is applied through lead 702*a* to modulate a 100-kc. carrier signal in balanced modulator 705 (FIG. 7D).

The carrier signal is generated in a 100-kc. oscillator 704 comprising tube V704 and associated circuitry indicated in FIG. 7C. The output of the oscillator which is single ended is converted to push-pull in the inverter circuit comprising tube V708. The referred-to push-pull effect is obtained by employing equal cathode and plate circuit resistors.

The waveform of the output signal from the balanced modulator therefore comprises a sine wave having a symmetrical sawtooth shaped envelope. Such modulated signal is applied in push-pull to the difference amplifier 706 (FIG. 7D). The difference amplifier includes a Model K2X operational amplifier A706, which functions to improve the wave shape of the modulated signal by adding the fundamentals of the wave and differentially combining the harmonics thereof. The output of the difference amplifier 706 is applied to a phaseshift network or resolver 707, which functions to generate two rectilinearly related output signals corresponding to a N—S and E—W geographical direction. The output from the cloud raster generator is obtained from the cathode followers V707 to provide a low impedance output. As indicated in FIG. 1, the output of the cloud raster generator 107 is applied to the X and Y deflection mechanism of the cathode-ray display mechanism 111. Since the Lissajou pattern produced by the phase displaced sinewave portion of the modulated signal is a circle, it will be apparent that the effect of the sawtooth modulating signal will be to generate a spiral raster which is proportional to the cloud diameter at a particular altitude.

As previously noted, the cloud size raster generator 107 effectively enlarges the spot in the display tube to a diameter proportional to the cloud size as the cloud height $h^*$ varies between its minimum and maximum values. The particular waveform generated by the cloud raster generator, as above explained, will superpose on the deflected cathode-ray beam an additional spiral wiggle as clearly shown in FIG. 9D, which represents an actual photograph of the display manifested on the display tube when the cloud geometry mechanism is in operation.

The specific construction of the clock pulser 101 has not been set forth in detail. The clock pulser can be any conventional type of commercially available precision oscillator or pulse generator. In the present case a precision oscillator connected to a chain of bistable frequency divider stages to provide the necessary 800 and 10 c.p.s. signal outputs was employed.

The circuit details of the height sweep generator 102 are illustrated in the lower portion of FIG. 6B. While any conventional sawtooth generator having good linearity can be employed for this purpose an integrator circuit having the same characteristic as was described in connection with the cloud raster generator (i.e., amplifier A702 and reset tube V707, FIG. 7C) is preferably employed. Referring to FIG. 6B, the integrator circuit including operational amplifier A603 is energized from a source of fixed potential and therefrom provides a linearly rising output corresponding to the height sweep signal. Such height signal is obtained from output terminal 603 which is connected across cathode follower V604. The type 5687 tube is employed to reset or cut off the output from amplifier A603 at a 10-c.p.s. repetition rate. The 10-c.p.s. signal from clock pulser 101 is applied at terminal 604 and the pulse gate generator V605 energizes the reset tube V603 at a like rate. It will be recalled that a cycle of computation of particle fallout is defined by each of the 10-c.p.s. signals.

The specific construction and mode of operation of the various components having been described, a brief review of the over-all operation of the computer will serve to integrate the functions of the various components and correlate their purposes with the general plan of solution of the fallout problem.

Referring to FIG. 1, the linearly increasing signal from height sweep generator 102 cyclically scans through each of the altitude zones or layers symbolized in FIG. 2, comprising the vertical extent of the mushroom cloud, at a repetition rate of 10 c.p.s. Each such scan defines a cycle of computation. The winds unit computer 103 has a plurality of sections corresponding respectively to each of the altitude zones, and each of such sections is sequentially and progressively energized in step with the correspondingly increasing amplitude increments of the height sweep. Each of the winds unit sections (FIG. 4A) include voltage attenuating means which are individually adjustable in accordance with the magnitude and direction of the previously determined wind existing in each of the altitude zones and produce an output signal representing the rectilinear coordinates of particle displacement due to the effect of the horizontal wind existing in the corresponding altitude zone. Since a particle is affected as it falls by the respective winds in each of the altitude zones, the sum of the outputs of each winds unit section as accumulated in the N—S and the E—W wind summers 108*a*, 108*b* will represent the total particle displacement occasioned by all of the winds acting on the mushroom cloud as the particle falls from a point of origin at any particular height but on the vertical axis of the mushroom cloud.

In order to account for the different times of fall of particles of various sizes, the particle slowness sweep generator 105 which is driven at a relatively high rate with respect to the height sweep generator generates a signal representing a particle slowness factor, *s*. Such signal is in effect a linear sawtooth signal varying from 0 to 50 volts in amplitude and repeated at an 800 c.p.s. rate. The particle slowness signal modulates the particle displacement signals from the wind summers (FIG. 8A) in the particle slowness modulators 109*a* and 109*b* to produce a spoke pattern display of the type indicated in FIG. 8B. The particle slowness modulators 109*a*, 109*b*, which include spoke generators, as described, combine the signals from the wind summers with such particle slowness sweep signal to produce a spoke pattern display, as shown in FIG. 8C. Each of the spoke lines represents the locus of particles of different sizes originating from the same height and affected by the same winds in each of the altitude zones.

Figure 9C:
Figure 9A:
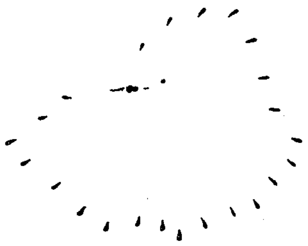
Figure 9D:
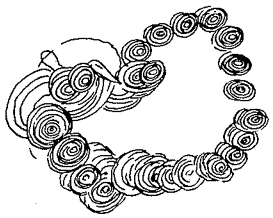
Figure 9B:
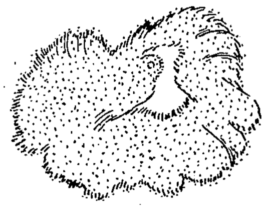

The cloud geometry mechanism comprising the cloud diameter or profile generator 104, together with cloud raster generator 107, then extends the computation to account for particles originating in the various altitude zones but offset from the vertical axis of the mushroom cloud. The cloud radius generator 104 produces a series of voltage breakpoint signals which will produce a trace such as is represented in FIG. 7B and corresponds to the different radii corresponding to the outline of a model mushroom cloud. The cloud radius voltage in turn is applied to the cloud raster generator portion of the cloud geometry mechanism in order to dither the display spot an amount commensurate with the cloud diameter at any given altitude. The output of the cloud raster generator is typified in FIG. 9D. The signals from the cloud raster generator are in turn combined with the signals from the particle slowness modulators in the respective vertical and horizontal summing amplifiers 110*a*, 110*b* and applied to the vertical and horizontal deflection mechanisms of the cathode-ray display device 111. The radioactivity generator 106 in turn intensity modulates the cathode-ray beam so that the final display as represented in FIG. 9B consists of a pattern having luminous portions directly indicating the ground distribution and radioactive intensity of fallout particles.

It will be apparent that the embodiments shown are only exemplary and that various modifications can be made in construction and arrangement within the scope of the invention as defined in the appended claims.

What is claimed is:

1. A computer for determining the intensity distribution pattern of fallout of radioactive particles originating in a mushroom cloud consequent to a nuclear explosion comprising: first means for generating a varying-amplitude signal the magnitude of which at any instant represents the height in terms of time of fall of a unit particle in said mushroom cloud, second means responsive to said height signal and to second applied signals representing the horizontal vectors of the true winds affecting said cloud said second means serving to generate signals representing the wind displacements of said particles originating at different heights corresponding to said height signal along the vertical axis of said cloud, third means synchronized with said height signal for generating a signal representing relative time of fall of particles of different sizes, a cloud geometry mechanism actuated by said first means for generating a signal representing the distribution of particles originating at positions offset from said vertical cloud axis at different heights in said cloud corresponding to said height signal, means for combining the output signals of said second and third means with the output signal of said cloud geometry mechanism, fourth means energized by said first and third means for generating a signal representing particle radioactivity as a function of particle height and time of fall, and means for registering the respective outputs of said combining and said fourth means.

2. The invention of claim 1 in which said registering means comprises a cathode-ray oscilloscope means for applying the output of said combining means to the deflection mechanism of said oscilloscope and means for intensity modulating the beam of said cathode-ray oscilloscope with the output of said fourth means.

3. The invention of claim 1 in which said second means comprises a plurality of separately energizable sections corresponding respectively to a predetermined number of altitude zones forming the vertical extent of said mushroom cloud, energizing means in each of said sections responsive respectively to different discrete amplitude increments of said varying-amplitude signal for sequentially energizing each section in consonance with the magnitude of said varying-amplitude signal, attenuating means in each section adjustable in accordance with the magnitude and direction of the known wind affecting each of said altitude zones, and means responsive to each of said sections for continuously summing the outputs of said sections.

4. The invention of claim 3 in which each of said separately energizable sections includes a means for generating a linearly increasing output signal verying from a 0 volt level to maximum amplitude and means for limiting the maximum amplitude of said output signal to a predetermined value common to each of said sections.

5. The invention of claim 4 in which said attenuating means includes means for resolving said output signal into rectilinearly related components.

6. The invention of claim 1 in which said cloud geometry mechanism comprises a plurality of separately energizable sections connected to said varying-amplitude signal generating means and corresponding respectively to an arbitrary predetermined number of horizontal altitude zones transverse to the axis of, and forming the vertical extent of, said mushroom cloud, energizing means in each of said sections responsive to different discrete amplitude increments of said varying-amplitude signal for sequentially energizing each of said sections in consonance with the magnitude of said varying-amplitude signal, and cloud-diameter representative means in each section, when energized, responsive to said amplitude increment for generating an output signal having an amplitude and polarity which is a function of said amplitude increment.

7. The invention of claim 6 in which said energizing means includes a first adjustable signal attenuating means for selecting the amplitude increment of said applied varying-amplitude signal at which energization of an energizable section will occur and said cloud-diameter representing means includes a second adjustable signal attenuating means for determining the amplitude and polarity of said output signal.

8. The invention of claim 6 including a cloud raster generator connected to said cloud diameter representative means, said cloud raster generator comprising means for generating a sawtooth signal having an amplitude proportional to said cloud diameter representing signal, and a frequency inversely proportional thereto.

9. The invention of claim 8 in which said cloud-raster generating means comprises means for comparing the output amplitudes of said cloud diameter representative means and said cloud-raster control signal generating means respectively and means responsive to equality between said last-named signals for terminating the output of said sawtooth signal generating means.

10. The invention of claim 8 including means for superimposing an oscillatory signal on said sawtooth signal and means for resolving such resulting signal into rectilinearly related components.

11. The invention of claim 10 including means for applying said resulting signal components to the deflection mechanism of a cathode-ray oscilloscope.

12. The invention of claim 1 in which said first means for generating a varying-amplitude signal comprises a first clock pulse controlled sweep generator for cyclically generating a signal having a linearly increasing amplitude at a relatively low frequency $f_1$, and in which said third means for generating a signal representing time of particle fall comprises a second clock-pulse controlled sweep generator for cyclically generating a linearly increasing signal at a frequency rate $f_2$, where $f_2$ exceeds $f_1$ by an amount sufficient to render said first linearly increasing signal quasi-constant with respect to said second linearly increasing signal, and respective means each energized by said clock pulses for terminating the output of said first and second sweep generators respectively.

13. The invention of claim 12 in which said signal combining means includes a means for generating a linearly increasing output signal representing the locus of particle fallout and means responsive to the output of said time of fall signal generator means for terminating the output of said locus representing generating means.

References Cited in the file of this patent

UNITED STATES PATENTS

| | | |
|---|---|---|
| 2,496,723 | Hipple | Feb. 7, 1950 |
| 2,519,238 | Duke et al. | Aug. 15, 1950 |
| 2,587,919 | Straus et al. | Mar. 4, 1952 |
| 2,771,243 | Wolin et al. | Nov. 20, 1956 |

OTHER REFERENCES

NBS Technical News Bulletin; April, 1956; vol. 40, No. 4, pages 57 and 58.